W. L. TARVIN.
SPARK ARRESTER.
APPLICATION FILED DEC. 31, 1921.
1,430,475.   Patented Sept. 26, 1922.
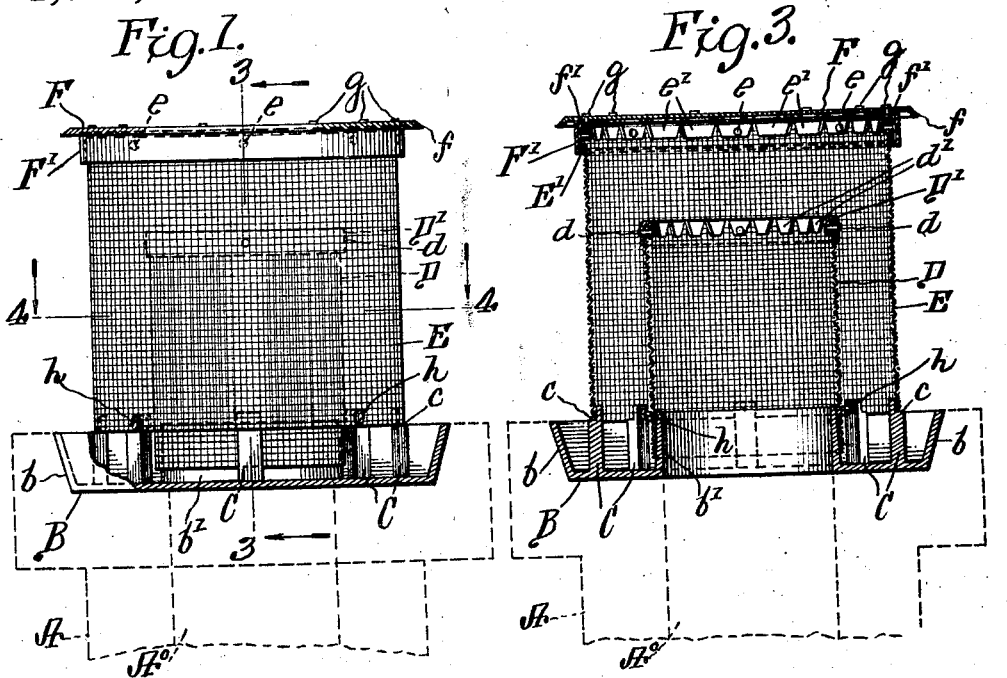
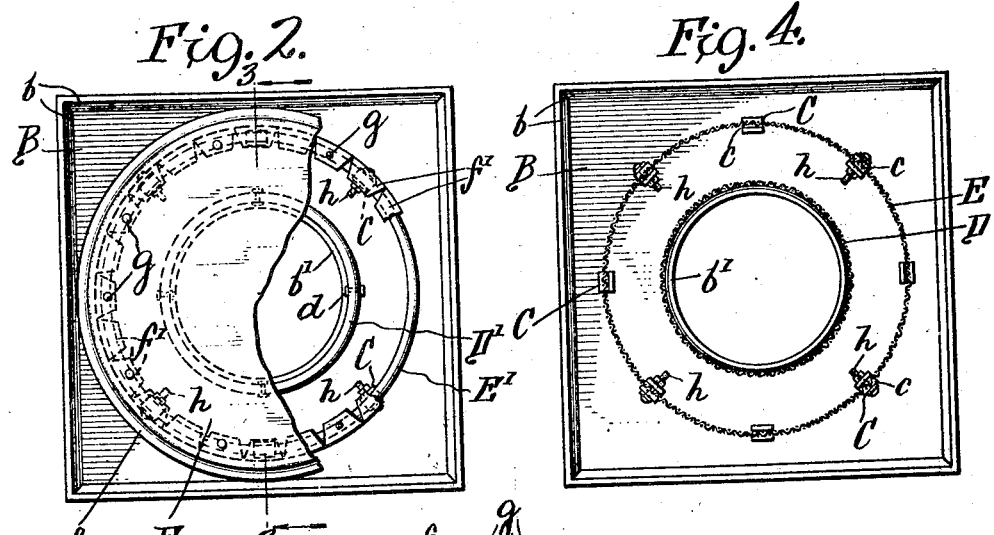
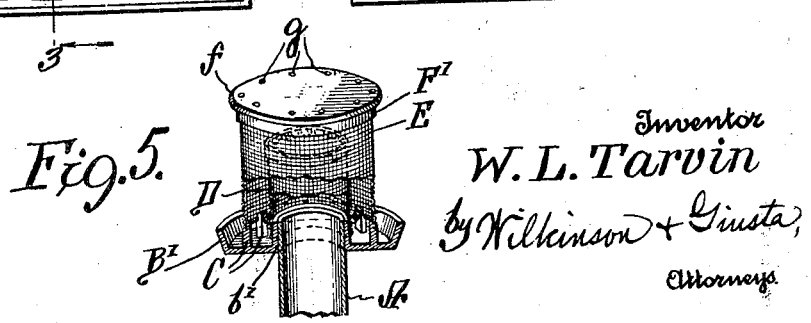
Inventor
W. L. Tarvin
by Wilkinson + Giusta
Attorneys Patented Sept. 26, 1922.

1,430,475

UNITED STATES PATENT OFFICE.

WILLIAM LAYFAYETT TARVIN, OF ROME, GEORGIA.

SPARK ARRESTER.

Application filed December 31, 1921. Serial No. 526,433.

*To all whom it may concern:*

Be it known that I, WILLIAM L. TARVIN, a citizen of the United States, residing at Rome, in the county of Floyd and State of Georgia, have invented certain new and useful Improvements in Spark Arresters; and I do hereby declare the following to be a full, clear, and exact description of the invention, such as will enable others skilled in the art to which it appertains to make and use the same.

My invention relates to improvements in spark arresters adapted for use on the top of stationary flues, such for instance as the flues of chimneys, smoke-stacks, or the like. The invention is more especially adapted for use on fire places, chimneys, or stove pipes, but not for use on factory chimneys, or locomotive engines.

The invention is especially intended to provide a cheap, simple and efficient apparatus which may be conveniently mounted on the top of the flue and will not require any attention when in use, but is self-cleaning and not liable to get out of order, is quite durable even though subjected to such conditions as exposure to the weather, or rain, snow, or the like, and the usual variations of temperature which are inevitable in the use of such apparatus.

My invention will be more fully understood after reference to the accompanying drawings in which like parts are indicated by similar reference symbols throughout the several views, and in which:

Figure 1 is a side elevation of the spark arrester, parts being broken away, and the chimney on which it is mounted being shown in dotted lines.

Figure 2 is a plan view of the apparatus shown in Figure 1 detached from the chimney, parts being broken away.

Figure 3 shows a central vertical section along the line 3—3 of Figs. 1 and 2, and looking in the direction of the arrows.

Figure 4 shows a section along the line 4—4 of Figure 1, and looking down; and

Figure 5 shows a modification in which the supporting pan is made circular and especially adapted for use with a cylindrical smokestack or stove pipe.

Referring first to Figures 1 to 4, A shows the chimney which may be of any suitable or preferred form, having the usual flue A° therein.

B represents a shallow pan which is adapted to rest on top of the chimney, which pan as shown is in the form of a square in cross section, having outwardly and upwardly inclined outer walls $b$, and an inner wall $b'$ which is preferably cylindrical on the interior, and in the form of a hollow frustum of a cone on the exterior, as shown in Figure 3.

Projecting upward from the bottom of the pan are a series of supporting legs C, shouldered as at $c$ to support the outer wire screen E which will be hereinafter more fully described. These legs may be cast integral with the pan B, or may be made separately and soldered or otherwise secured to said pan.

D represents the inner cylindrical screen of wire mesh having its bottom adapted to wedge down over the upwardly tapered flange $b'$, and the top of the screen D is provided with a stiffening ring D' which may be made of any suitable construction, but is shown as a circular ring having inturned tabs $d'$ which are fastened to the wire screen D by means of suitable rivets $d$. This wire screen D is open at the top and bottom as shown, and surrounding this inner screen, and spaced therefrom, is the outer cylindrical screen E, the lower end of which rests on the shoulders $c$ of the legs C, and is secured to said legs by means of suitable bolts $h$.

The upper end of this cylindrical screen E is provided with a reinforcing ring E', which may be of any suitable construction, but as shown is an annular band provided with inturned tabs $e'$, said ring being fastened to the screen E by means of rivets $e$.

Mounted over the outer cylindrical screen E, and closing the upper end thereof, is a circular cap F preferably flanged downwardly on its exterior, as at $f$, which cap may be connected to the upper end of the outer screen E in any convenient way, as by the band F' having inwardly turned tabs $f'$ which are fastened to said cap by means of the rivets $g$. This cap is preferably made removable so that access may be had to the interior of the device when desired.

It will be noted that the lower edge of the outer wire screen E is in substantially the same plane as the upper edge of the pan so that this lower edge will not dip into any water that may accumulate in the pan, thus causing the screen to rust or rot away.

In the modification shown in Figure 5, the pan B' is shown as circular in horizontal section instead of rectangular as in the other figures, but the operation of the device is substantially the same in both cases.

This operation will now be described:—

The device may be mounted on the top of the chimney and cemented or otherwise secured thereto in any convenient way. After the parts are all in place, and with the top on, rain water or snow will soon accumulate in the pan, and this water will tend to trickle from the top of the cap down in the pan which projects beyond the edge of the cap, and thus the chamber in the pan surrounding the annular flange $f'$ will be normally supplied with water from atmospheric conditions. When first installed, water may be put in the pan if desired, but this will be unnecessary for the apparatus will not depend upon the presence of water for its efficiency in action.

As the solid particles carried up by the gases of combustion rise into the spark arrester, the heavier particles are either dropped downwards in the flue, to be subsequently consumed, or taken upwards again, or they will pass over the top of the ring D' and will fall in the annular space between the two cylindrical screens D and E into the supporting pan. The water that will ordinarily be found in this pan will promptly quench any sparks, but whether there is any water there or not, the gases passing over the outer wire screen will so lessen the convection currents of the gases that the solid particles will tend to fall and remain in the pan.

Now when a rainfall occurs, especially a heavy rainfall, the rain water will flow freely into the pan and overflowing therein will carry most of the solid matter contained in the pan up over the sloping wall $b$, and the same will fall clear of the chimney or smokestack.

Owing to this self-cleaning action of the apparatus, the solid particles will accumulate in the pan so slowly that the same need only be cleaned out by hand at long intervals, if at all. Should the apparatus become clogged up from long continued use, or with particularly sooty fuel, it may be cleaned out when desired by simply removing the cap F, brushing the adhering solid particles from the inner and outer screens D and E, and also cleaning out the solid particles from the supporting pan, but as previously stated such cleaning would only be necessary at long intervals.

When the cap F is removed the inner screen D may be lifted off of its seat on the annular flange $b'$, and cleaned, or a new inner screen substituted therefor, if desired.

It will be seen that the apparatus may be quickly assembled, or taken apart when desired, for purposes of installation, removal, or repairs.

It will also be seen that the device is of simple and cheap construction, but yet of artistic design, and may be readily removed from or applied to the smokestack or chimney.

It will be obvious that various modifications might be made in the construction, combination and arrangement of parts which could be used without departing from the spirit of my invention, and I do not mean to limit the invention to such details except as particularly pointed out in the claims.

Having thus described my invention what I claim and desire to secure by Letters Patent of the United States is:—

1. A spark arrester adapted for use with fixed chimneys or smokestacks, comprising a pan provided with a central opening adapted to register with the flue, with an annular flange surrounding said opening, said flange and said outer walls forming a trough to receive the larger solid particles passing up the flue, and also to receive water from rain or snow, an inner cylindrical screen open at both ends and having its lower end slipped over and engaging said annular flange, legs projecting upwardly from the bottom of said pan and arranged concentric with but spaced away from said annular flange, an outer cylindrical screen having its lower end secured to said legs, and a cap closing the upper end of said outer screen, substantially as described.

2. A spark arrester adapted for use with fixed chimneys or smokestacks, comprising a pan having outwardly and upwardly radial outer walls, and provided with a central opening adapted to register with the flue, with a tapered annular flange surrounding said opening, said flange and said outer walls forming a trough to receive the larger solid particles passing up the flue, and also to receive water from rain or snow, an inner cylindrical screen open at both ends and having its lower end slipped over and engaging said tapered annular flange, legs projecting upwardly from the bottom of said pan and arranged concentric with but spaced away from said annular flange, an outer cylindrical screen having its lower end secured to said legs, the lower edge of said outer screen being approximately at the level of the upper edge of the outer walls of the pan, and a cap closing the upper end of said outer screen, substantially as described.

WILLIAM LAYFAYETT TARVIN.